United States Patent
Baranowski et al.

(10) Patent No.: US 8,504,277 B2
(45) Date of Patent: Aug. 6, 2013

(54) METHOD AND DEVICE FOR DETERMINING A CONTROL PARAMETER FOR A FUEL INJECTOR OF AN INTERNAL COMBUSTION ENGINE

(75) Inventors: Dirk Baranowski, Regensburg (DE); Klaus Hengl-Betz, Regensburg-Schwabelweis (DE); Thorsten Lauer, Holzheim a. Forst (DE)

(73) Assignee: Continental Automotive GmbH, Hannover (DE)

( * ) Notice: Subject to any disclaimer, the term of this patent is extended or adjusted under 35 U.S.C. 154(b) by 449 days.

(21) Appl. No.: 12/602,223

(22) PCT Filed: May 23, 2008

(86) PCT No.: PCT/EP2008/056380
§ 371 (c)(1),
(2), (4) Date: Nov. 30, 2009

(87) PCT Pub. No.: WO2008/145617
PCT Pub. Date: Dec. 4, 2008

(65) Prior Publication Data
US 2010/0179744 A1    Jul. 15, 2010

(30) Foreign Application Priority Data
May 29, 2007   (DE) .......................... 10 2007 024 823

(51) Int. Cl.
*G06F 17/00* (2006.01)
*G06F 19/00* (2011.01)
*G06G 7/70* (2006.01)
*F02M 57/02* (2006.01)

(52) U.S. Cl.
USPC ........... 701/103; 701/104; 701/105; 701/102; 73/114.43; 73/114.51; 123/445; 123/447; 123/456; 123/457; 123/463; 123/467

(58) Field of Classification Search
USPC   73/114.43, 114.45, 114.49, 114.51; 123/445, 123/447, 456, 457, 463, 467; 701/101, 102, 701/103, 104, 105, 110, 114, 115
See application file for complete search history.

(56) References Cited

U.S. PATENT DOCUMENTS

| | | | |
|---|---|---|---|
| 5,633,458 A | * | 5/1997 | Pauli et al. .................. 73/114.51 |
| 5,732,675 A | | 3/1998 | Yoshida et al. ............... 123/305 |

(Continued)

FOREIGN PATENT DOCUMENTS

| | | |
|---|---|---|
| DE | 102006026928 | 12/2007 |
| EP | 0937882 | 8/1999 |

OTHER PUBLICATIONS

German Office Action for Application No. 10 2007 024 823.9 (4 pages) Jan. 23, 2009.

(Continued)

*Primary Examiner* — Stephen K Cronin
*Assistant Examiner* — Raza Najmuddin
(74) *Attorney, Agent, or Firm* — King & Spalding L.L.P.

(57) ABSTRACT

In a method for determining a control parameter for a fuel injector of an internal combustion engine, the problem of enabling more precise determination of the control parameter, even if the fuel pressure (FUP) present on the fuel injector varies, is solved in that the fuel pressure (FUP) present on the fuel injector during the injection (I1, I2, I1', I1") is concluded while allowing for the time of the fuel pressure value detection and/or the crankshaft angle position of the internal combustion engine during the detection of the fuel pressure value, and that the control parameter is determined based on the fuel pressure (FUP) that was concluded.

9 Claims, 1 Drawing Sheet

U.S. PATENT DOCUMENTS

| | | | | |
|---|---|---|---|---|
| 6,102,004 A * | 8/2000 | Cowden et al. | | 123/446 |
| 6,125,823 A * | 10/2000 | Thomas | | 123/464 |
| 6,247,451 B1 * | 6/2001 | Estevenon et al. | | 123/456 |
| 6,357,420 B1 * | 3/2002 | Matta | | 123/446 |
| 6,587,962 B1 * | 7/2003 | Hepner et al. | | 714/19 |
| 6,705,294 B2 * | 3/2004 | Shinogle | | 123/486 |
| 6,722,345 B2 * | 4/2004 | Saeki et al. | | 123/435 |
| 6,732,577 B2 * | 5/2004 | Leman et al. | | 73/114.48 |
| 6,745,620 B2 * | 6/2004 | Kreikemeier et al. | | 73/114.72 |
| 6,755,176 B2 * | 6/2004 | Takeuchi et al. | | 123/299 |
| 6,779,511 B2 * | 8/2004 | Tonetti et al. | | 123/480 |
| 6,801,847 B2 * | 10/2004 | Jaliwala et al. | | 701/104 |
| 6,964,261 B2 * | 11/2005 | Warne et al. | | 123/436 |
| 7,319,930 B2 * | 1/2008 | Dietl et al. | | 701/104 |
| 7,343,240 B2 * | 3/2008 | Sugiyama et al. | | 701/104 |
| 7,536,996 B2 * | 5/2009 | Nagai | | 123/435 |
| 7,588,515 B2 * | 9/2009 | Miyazaki | | 477/111 |
| 7,628,146 B2 * | 12/2009 | Kloppenburg et al. | | 123/673 |
| 7,729,845 B2 * | 6/2010 | Iwashita et al. | | 701/104 |
| 7,747,377 B2 * | 6/2010 | Nakata et al. | | 701/103 |
| 7,835,850 B2 * | 11/2010 | Nakata et al. | | 701/104 |
| 7,841,319 B2 * | 11/2010 | Thomas | | 123/478 |
| 7,845,343 B2 * | 12/2010 | Imai | | 123/674 |
| 7,865,293 B2 * | 1/2011 | Ishizuka et al. | | 701/104 |
| 7,895,990 B2 * | 3/2011 | Ishizuka et al. | | 123/478 |
| 2003/0121501 A1 | 7/2003 | Barnes et al. | | 123/446 |
| 2004/0099054 A1 * | 5/2004 | Shinogle | | 73/119 A |
| 2008/0228374 A1 * | 9/2008 | Ishizuka et al. | | 701/103 |
| 2009/0063013 A1 * | 3/2009 | Nakata et al. | | 701/103 |
| 2009/0326788 A1 * | 12/2009 | Yuasa et al. | | 701/104 |
| 2010/0152994 A1 * | 6/2010 | Huber et al. | | 701/103 |
| 2010/0179744 A1 * | 7/2010 | Baranowski et al. | | 701/103 |

OTHER PUBLICATIONS

International Search Report and Written Opinion for Application No. PCT/EP2008/056380 (12 pages) Oct. 13, 2008.

* cited by examiner

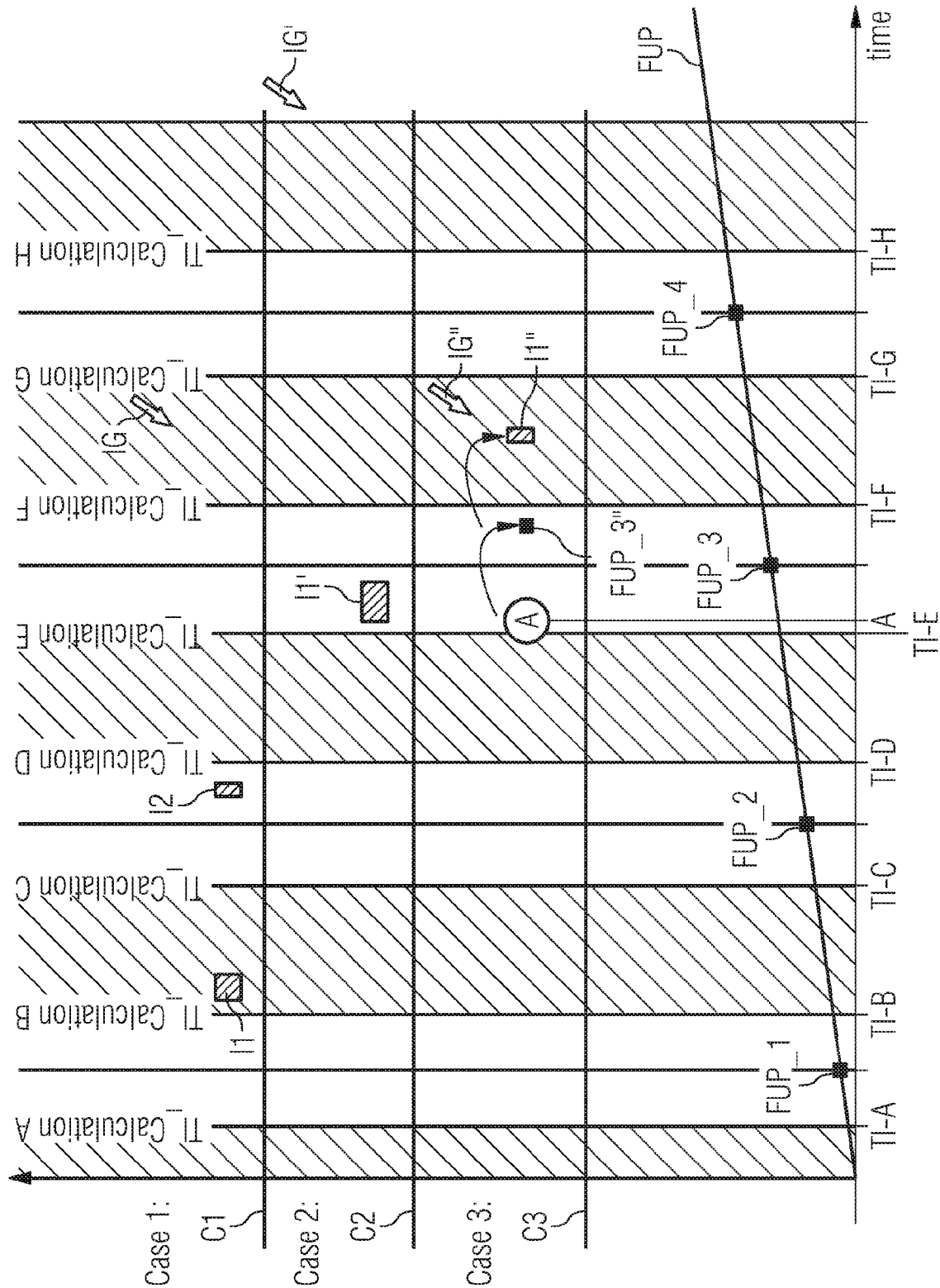

METHOD AND DEVICE FOR DETERMINING A CONTROL PARAMETER FOR A FUEL INJECTOR OF AN INTERNAL COMBUSTION ENGINE

CROSS-REFERENCE TO RELATED APPLICATIONS

This application is a U.S. National Stage Application of International Application No. PCT/EP2008/056380 filed May 23, 2008, which designates the United States of America, and claims priority to German Application No. 10 2007 024 823.9 filed May 29, 2007, the contents of which are hereby incorporated by reference in their entirety.

TECHNICAL FIELD

The present invention relates to a method for determining a control parameter for a fuel injector of an internal combustion engine in which at least one fuel pressure value present at the fuel injector is recorded, and in which a control parameter for the fuel injector is determined in consideration of the recorded fuel pressure value.

BACKGROUND

The invention also relates to a device for determining a control parameter for a fuel injector of an internal combustion engine, with a measuring unit with which at least one fuel pressure value that is present at the fuel injector is able to be recorded and with an evaluation unit with which a control parameter for the fuel injector is able to be determined in consideration of the recorded fuel pressure value.

Increasing numbers of legal specifications regarding exhaust emission characteristics and specifications from the vehicle manufacturers require ever more precise feed-forward control of the fuel metering in internal combustion engines. In most combustion methods, it is necessary to calculate and feed forward the air-fuel ratio or the fuel mass supplied to the combustion chamber per combustion cycle as precisely as possible. In this way, for example, the homogenous combustion that is usual in petrol engines requires an air-fuel ratio that is as accurate as possible for catalytic-converter management on the one hand and, on the other hand, for temperature management in the combustion chamber and in the components carrying the exhaust gases. More complex combustion methods, such as HCCI (homogenous charge compression ignition) or CAI (compressed auto ignition) set combustion parameters, such as the ignition point and rate of combustion, with the help of accurate fuel mass deliveries.

Fuel injectors are used to apportion the required fuel mass into the cylinders of the internal combustion engine. In the present context, the term fuel injector shall be understood to include all types of control elements that are used to apportion the required fuel mass into the cylinders (injectors, fuel injection valves, etc.). Usually, a fuel injector is an electrically actuated control element. As well as single injections, multiple injections, i.e. more than one injection per combustion cycle, are also used in all combustion methods, in particular in engines that are operated with direct fuel injection.

The conversion of the fuel mass to be apportioned into, in particular, an electrical actuation signal of the fuel injector is dependent on the fuel pressure that is present at the fuel injector. This fuel pressure is therefore measured, filtered if necessary and fed into a model, which calculates a control parameter, for example the injection time, corresponding to the desired injection quantity as a function of the recorded fuel pressure. Fuel is then injected by the fuel injector for the duration of this injection time.

Conventional engine management systems have several software levels, real-time software (also called IO software) and application software. For example, the injection time and start or stop time of the injections are continually calculated by the application software and passed on to the IO software. The real-time software receives the data in fixed time slots and/or event slots from the application software and executes it by implementing the specifications autonomously.

It is thereby conceivable for changes to be made to the injection time, for example, even during a current injection. A second injection may even be activated. In this way, it is possible to implement changes in the fuel mass that is to be injected particularly quickly.

A problem is presented by the dependency of the calculation of control parameters, such as the injection time calculation, on the injection pressure, that is the fuel pressure that is present at the fuel injector. In this way, too much or too little fuel may be injected, in particular if the present fuel pressure changes between the time that the injection time is calculated and the time of the injection, depending on whether the fuel pressure increases or decreases. Injections of the incorrect quantity of this kind result in an unfavorable operating performance of the internal combustion engine, for example increased exhaust emission values.

A corresponding problem occurs if, following a completed injection, the injection quantity or injection time of the first injection is checked, such that an incorrectly injected quantity in the first injection can be corrected with a second injection if necessary. If the present fuel pressure has changed between the first injection and the time of the check calculation for the associated injection quantity or time, the check calculation may return the result that an incorrect quantity was injected in the first injection, even though this was not actually the case. A subsequent corrective injection would not therefore result in an improvement, but in a deterioration of the injection result.

Attempts have been made to compensate for lambda deviations generated by incorrect injection with the fuel mass during changes in the operating point by means of transitional characteristic maps. Attempts have also been made to configure the lambda controllers in such a way that they can react to deviations due to incorrectly injected quantities. The exhaust gas cleaning components and other components of motor vehicles have also been dimensioned or arranged in such a way that they can compensate for any deviations in the injected fuel quantity and withstand thermal interference caused by lambda fluctuations. Finally, attempts have been made to make practical allowances in the lambda setpoint in order to keep the internal combustion engine in a safe lambda range for the components at all times. However, a satisfactory solution for the problem discussed above does not currently exist.

SUMMARY

On the basis of the prior art, as described above, according to various embodiments, a method and a device of the type stated at the beginning can be specified with which a control parameter for a fuel injector of an internal combustion engine is able to be more accurate, even in the event of changes in the present fuel pressure.

According to an embodiment, in a method for determining a control parameter for a fuel injector of an internal combustion engine, in which at least one fuel pressure value that is present at the fuel injector is recorded, and in which a control parameter for the fuel injector is determined in consideration of the recorded fuel pressure value, the fuel pressure that is present at the fuel injector at the time of the injection is concluded in consideration of the time of the fuel pressure value recording and/or the crankshaft angle position of the internal combustion engine at the time of the fuel pressure value recording, and the control parameter is determined on the basis of the fuel pressure that has been concluded.

According to a further embodiment, the control parameter may concerns the injection time and/or the opening lift of the fuel injector and/or the opening cross-section of the fuel injector and/or an electrical variable serving to control the fuel injector. According to a further embodiment, the control parameter can be determined for an injection that takes place after the fuel pressure recording. According to a further embodiment, the time of the fuel pressure value recording and/or the crankshaft angle position of the internal combustion engine at the time of the fuel pressure value recording can be estimated. According to a further embodiment, the time of the fuel pressure value recording and/or the crankshaft angle position of the internal combustion engine at the time of the fuel pressure value recording can be recorded and stored. According to a further embodiment, at least two fuel pressure values can be recorded, whereby the fuel pressure that is present at the time of the injection is concluded in consideration of the time of the at least two fuel pressure value recordings and/or the crankshaft angle positions of the internal combustion engine at the time of the at least two fuel pressure value recordings. According to a further embodiment, the fuel pressure that is present at the time of the injection can be concluded by means of an interpolation and/or extrapolation of the recorded fuel pressure values. According to a further embodiment, the fuel pressure that is present at the time of the injection is concluded whereby the recorded fuel pressure value may be assumed to be the fuel pressure that is present at the time of the injection. According to a further embodiment, the fuel pressure value that is present at the fuel injector can be recorded shortly before the control parameter is determined. According to a further embodiment, the control parameter can be determined for an injection that has taken place before the fuel pressure value recording and/or the fuel quantity that has been injected in an injection that has taken place before the fuel pressure recording.

According to another embodiment, a device for determining a control parameter for a fuel injector of an internal combustion engine, may comprise a measuring unit, with which at least one fuel pressure value that is present at the fuel injector is able to be recorded, and an evaluation unit, with which a control parameter for the fuel injector is able to be determined in consideration of the recorded fuel pressure value, wherein the fuel pressure that is present at the fuel injector at the time of the injection can be concluded with the evaluation unit in consideration of the time of the fuel pressure value recording and/or the crankshaft angle position of the internal combustion engine at the time of the fuel pressure value recording, and the control parameter is able to be determined with the evaluation unit on the basis of the fuel pressure that has been concluded.

According to a further embodiment, the control parameter may concern the injection time and/or the opening lift of the fuel injector and/or the opening cross-section of the fuel injector and/or an electrical variable that serves to control the fuel injector. According to a further embodiment, an estimating unit can be provided with which the time of the fuel pressure value recording and/or the crankshaft angle position of the internal combustion engine at the time of the fuel pressure value recording is able to be estimated. According to a further embodiment, a recording and storage unit can be provided with which the time of the fuel pressure value recording and/or the crankshaft angle position of the internal combustion engine at the time of the fuel pressure value recording is able to be recorded and stored. According to a further embodiment, at least two fuel pressure values are able to be recorded with the measuring unit, whereby the fuel pressure that is present at the time of the injection can be concluded with the evaluation unit in consideration of the times of the at least two fuel pressure value recordings and/or the crankshaft angle positions of the internal combustion engine at the time of the at least two fuel pressure value recordings. According to a further embodiment, the fuel pressure that is present at the time of the injection can be concluded with the evaluation unit by means of an interpolation and/or extrapolation of the recorded fuel pressure values.

BRIEF DESCRIPTION OF THE DRAWINGS

Exemplary embodiments of the invention will be described below with reference to a drawing.

FIG. 1 shows a schematic diagram of three different cases for the determination of a control parameter for a fuel injector of an internal combustion engine.

DETAILED DESCRIPTION

For the method stated at the beginning, it is intended in accordance with various embodiments that the fuel pressure present at the fuel injector at the time of the injection shall be concluded, in consideration of the time of the fuel pressure recording and/or the crankshaft angle position of the internal combustion engine when the fuel pressure value is recorded, and that the control parameter shall be determined on the basis of the fuel pressure that is concluded.

Accordingly, for the device according to various embodiments, it is intended that the fuel pressure that is present at the fuel injector at the time of the injection can be concluded with the evaluation unit in consideration of the time of the fuel pressure recording and/or the crankshaft angle position of the internal combustion engine when the fuel pressure value is recorded, and that the control parameter is able to be determined with the evaluation unit based on the fuel pressure that was concluded.

The device according to various embodiments can exhibit in particular a unit for taking into consideration the time of the fuel pressure value recording and/or the crankshaft angle position of the internal combustion engine during the fuel pressure value recording, and a unit for concluding the fuel pressure that is present at the fuel injector at the time of the injection.

According to various embodiments, for the calculation of the relevant control parameter, the time and/or the angle of the crankshaft of the internal combustion engine when the fuel pressure value is recorded is taken into consideration. The fuel pressure present at the fuel injector during the injection is concluded on the basis of this information. A fuel pressure assignment therefore takes place for the injection event. The control parameter is in particular one of the parameters influencing the fuel quantity apportioned into the combustion chambers of the internal combustion engine.

In this way, a possible change in the fuel pressure at the fuel injector is taken into account when the control parameter is calculated. The determination of the control parameter is therefore optimized with the help of a position or time reference for the pressure recording value. The information obtained in this way about the fuel pressure that is expected to be present at the time of the injection can then be used in pressure models that use this as a basis to determine the control parameter for the fuel injector corresponding to a desired fuel quantity that is to be delivered.

In the process, a reference value can be established, for example, between the time or position, i.e. the crankshaft angle, when the pressure is measured and the time or position when the control parameter and/or the injection is calculated. If, for example, it is known that there is a certain temporal pressure gradient, the time difference between the fuel pressure recording and the subsequent injection can be used to estimate the fuel pressure that is likely to be present at the time of the injection.

It is also conceivable that the fuel pressure present will have remained virtually unchanged from the time that the fuel pressure was recorded if the fuel pressure is recorded shortly before the injection in order to conclude the fuel pressure that will be present at the time of the injection.

By taking into consideration, therefore, the time of the fuel pressure value recording and/or the crankshaft angle position at the time that the fuel pressure is recorded, the control parameter for the fuel injector can be executed on the basis of the fuel pressure that is likely to be present at the time of the injection. The result is a more accurate determination of the control parameter, in particular even if the present fuel pressure changes.

Errors in the supplied quantity of fuel are therefore minimized by the more accurate feed-forward control in accordance with various embodiments. This ensures smaller lambda deviations, in particular also in dynamic processes, such as transient conditions of the system. The more accurate feed-forward control results in smaller deviations from the setpoint operating point, takes the burden off the controller and allows application tolerances, e.g. temperature-dependent enrichment during high load, to be reduced. In addition, more accurate catalytic-converter management is enabled so that, with considerably more beneficial catalytic converters, the same requirements on exhaust gas emissions can be fulfilled as before.

In particular, a plurality of fuel pressure values can of course be recorded, which can then be taken into consideration in the manner as described in the present disclosure. Likewise, a plurality of control parameters for the fuel injector can of course be determined.

The recorded fuel pressure is the pressure that is present at the fuel injector. It can also be the pressure in a fuel rail of a common rail injection system that is recorded by means of a suitable pressure measurement. Other means of recording the fuel pressure are of course possible.

The internal combustion engine can be any type of internal combustion engine that requires an injection of fuel, in particular petrol engines or diesel engines in motor vehicles. According to various embodiments, the term fuel injector includes all types of control element that are used to apportion a fuel mass into the cylinders of an internal combustion engine (injectors, injection valves, etc.), in particular electrically actuated control elements. Such control elements are known per se to the expert.

The crankshaft angle reference values or times of the pressure recording, and the times or crankshaft angle positions of the injection phasing, that is the calculated injection time, and the time or the crankshaft angle position of the injection time calculation are compared and used to conclude the fuel pressure that is present during the injection. When the control parameter is determined, it is then possible to use the angle position or the time to analyze what fuel pressure will be present at the injector of the cylinder in question during the next injection.

By contrast, with the methods and devices known from the prior art, a change in fuel pressure remains unconsidered. In particular, it is not checked whether the injection for a combustion process has already taken place, or is still to take place, or is currently taking place. A pressure is not assigned to the injection event with the prior art.

According to an embodiment, the control parameter can concern the injection time. Depending on the type of the fuel injector, however, it can also concern other control parameters. Such control parameters are known per se to the person skilled in the art regardless of the injector that is used in each case. For example, it can thus alternatively or additionally concern the opening lift of the fuel injector and/or the opening cross-section of the fuel injector with appropriate injection valves (e.g. piezo valves). In particular for electrically actuated injectors (e.g. solenoid valves), it can alternatively or additionally concern an electrical variable that serves to actuate the fuel injector, for example the level of electrical current. In particular, the injection time for which the injector is actuated is of central importance for the injected quantity of fuel of a fuel injector. As well as the injection time and the fuel pressure, the width of opening and the lift of the injector also have an effect on the quantity of fuel to be apportioned, for example. In this context, the opening lift means, for example, the height of the valve needle above the needle seat in an injection valve when the injection hole of the valve opens. Accordingly, the opening cross-section of the injector means the size of the injection hole or holes for injecting the fuel into the combustion chamber. It is thus conceivable, for example, that only one or several injection holes are opened depending on the quantity of fuel to be injected. The start and end time of the injection that is to take place is also of significant importance for the injection result and, accordingly, can also be taken into consideration. Other control parameters are of course also conceivable, for example the speed when raising a valve needle of an injection valve from the needle seat, etc.

According to a further embodiment, the control parameter can be determined in particular for an injection that is taking place after the fuel pressure recording. For this, the control parameter for an injection that is taking place after the fuel pressure recording can be determinable using the evaluation unit of the device. With this embodiment, it is possible to calculate future injections more accurately so that injection of an incorrect quantity, i.e. an injection of too much or too little fuel, can be reliably prevented from the outset.

According to an embodiment of the method, the time of the fuel pressure value recording and/or the crankshaft angle position of the internal combustion engine that is present when the fuel pressure value is recorded can be estimated. To this end, the device according to various embodiments can exhibit an estimation unit with which the time of the fuel pressure value recording and/or the crankshaft angle position that is present when the fuel pressure value is recorded is able to be estimated.

An embodiment of this type may be then particularly advantageous if the fuel pressure acquisition takes place in a fixed temporal pattern (e.g. fixed 10 ms pattern/segment synchronous). When the control parameter is determined, it is thus estimated when the fuel pressure was last recorded (sampled), i.e. in particular at which crankshaft angle or what time. An advantage of this embodiment is that no additional time or crankshaft angle information is stored. This saves memory and calculation requirements, so that the control parameter is able to be calculated quickly and in an efficient way.

According to an alternative embodiment of the method, the time of the fuel pressure value recording and/or the crankshaft position of the internal combustion engine when the fuel pressure value is recorded can be recorded and stored. The device can exhibit a recording and storage unit for this purpose. In this embodiment, therefore, the fuel pressure value is assigned a time and/or angle position when it is recorded that is taken into consideration in the subsequent process for determining the control parameter. In this way, the time of the fuel pressure recording or the crankshaft angle position when the fuel pressure value is recorded can be considered in a particularly accurate way.

According to a particularly practical embodiment of the method, at least two fuel pressure values can be recorded, whereby the fuel pressure that is present at the time of the injection can be concluded in consideration of the times of the at least two fuel pressure value recordings and/or the crankshaft angle positions of the internal combustion engine when the at least two fuel pressures are recorded. Accordingly, it can be envisaged that, with the measuring unit of the device, at least two fuel pressure values are able to be recorded, whereby the evaluation unit can be used to conclude the fuel pressure that is present at the time of the injection in consideration of the times of the at least two fuel pressure recordings and/or the crankshaft angle positions of the internal combustion engine when the at least two fuel pressures are recorded.

According to this embodiment, fuel pressures that are present at the fuel injector are thus measured at at least two different points in time. The pressure measurement can, for example, take please in a fixed pattern, in particular several times per revolution of the crankshaft. Depending on the rotational speed of the internal combustion engine, four pressure measurements can be taken per revolution of the crankshaft, for example. In the process, the measured fuel pressure values can be related to each other such that the fuel pressure that is present at the time of the injection can be concluded particularly accurately. In this way, for example, it is possible to determine a temporal gradient for the fuel pressure that is present, and thus to determine the development of the fuel pressure. This information can in turn be used to conclude a pressure that is present at another point in time.

A particularly simple and accurate evaluation possibility when at least two fuel pressure values are recorded consists of concluding the fuel pressure that is present at the time of the injection by means of an interpolation and/or extrapolation of the recorded fuel pressure values. To this end, the evaluation unit of the device can be designed to conclude the fuel pressure that is present at the time of the injection by means of an interpolation and/or extrapolation of the recorded fuel pressure values. For example, when two fuel pressure values are recorded, a linear progression of the fuel pressure gradients can thus be assumed and, on this basis, the fuel pressure determined that is expected to be present at the time of the injection. If more than two fuel pressure values are recorded, the accuracy of the interpolation or extrapolation increases accordingly. It is even then possible to investigate a variety of other progressions of the pressure gradient, as well as a linear progression, and to conclude the fuel pressure that is present at the time of the injection on this basis.

According to a further embodiment, the fuel pressure that is present at the time of the injection can be concluded in a particularly simple way, whereby the recorded fuel pressure value is assumed to be the fuel pressure that is present at the time of the injection. For this purpose, the device can be configured such that the evaluation unit concludes the fuel pressure that is present at the time of the injection whereby the recorded fuel pressure value is assumed to be the fuel pressure that is present at the time of the injection. For this, it is possible in particular to request a fuel pressure recording at a certain crankshaft angle. The result of this pressure measurement can then be directly used to operate the relevant models that calculate the control parameter.

This embodiment is particularly advantageous if the fuel pressure value that is present at the fuel injector is recorded shortly before the control parameter is determined. For this purpose, the fuel pressure that is present at the fuel injector can be able to be recorded with the measuring unit of the device shortly before the control parameter is determined. In particular if the injection that is to be determined also takes place at a short time interval before the recording of the fuel pressure, it can be assumed that the fuel pressure that is present has only varied insignificantly from the recorded fuel pressure. In this case, it is therefore possible to accept the recorded fuel pressure as the fuel pressure that is also present when the injection takes place. The method of specifically requesting the fuel pressure recording shortly before an injection is then particularly advantageous if a very accurate injection is required, such as for HCCI or CAI combustion processes.

According to a further embodiment, the control parameter can be determined for an injection that has taken place before the fuel pressure recording and/or the injected fuel quantity in an injection that has taken place before the fuel pressure recording. For this purpose, the control parameter for an injection that has taken place before the fuel pressure recording and/or the injected fuel quantity in an injection that has taken place before the fuel pressure recording can be able to be determined with the evaluation unit of the device. According to various embodiments, both future injection events and injection events that have already occurred can thus be accurately calculated. Accordingly, a fuel pressure recording can also be performed shortly after an injection that has already occurred with a specific request for a fuel pressure recording.

It is therefore not only possible to accurately determine injection events in the future according to various embodiments, but, contrary to the prior art, it can be accurately checked whether control parameters, such as the injection time, have been correctly calculated and whether the correct fuel quantity has been injected in injections that have already occurred. In this case, the fuel pressure that was present during the injection that has already occurred is thus deduced. An error in the injection can be determined and, if desired and possible, suitable countermeasures can be taken.

It is thus possible for an error that is detected during the determination to be corrected with a second injection. To this end, the device according to various embodiments can be configured accordingly. It is also conceivable for an error detected during the correction calculation to be reported to other components of the internal combustion engine. This is then particularly advantageous if the error in the injection can no longer be corrected, for example if too much fuel has been injected. Reporting this error to other components allows them to be suitably prepared for the consequences of the incorrect injection, so that impairment or damage to said components can be largely prevented. For example, the injection error can be transferred to a lambda regulator so that the latter can take the incorrect injection into consideration in a specific manner for various error inputs. Many correction factors that have not yet been implemented on the basis of models and which require complex application can be omitted and replaced by physical models, which can be easily populated with a small amount of measured data and with the help of calculations.

The device can in particular be arranged to perform the method steps as described above.

In the diagram, the time is plotted on the x-axis. Three different cases for the determination of a control parameter are schematically represented one above the other on the y-axis (Case 1, Case 2, Case 3). The example shown concerns calculations of the injection time for which a fuel injector is controlled. Other control parameters can of course also be calculated in addition or as an alternative. The three cases Case 1, Case 2 and Case 3 are delimited by horizontal separating lines C1, C2 and C3 for the sake of clarity, whereby Case 1 is shown above separating line C1, Case 2 between separating lines C1 and C2, and Case 3 between separating lines C2 and C3.

In the example shown, a fuel pressure FUP that increases linearly over time is present at the fuel injector. This is plotted underneath separating line C3 in the diagram.

The example shows the case of a six-cylinder internal combustion engine operating at a speed of 4000 rpm.

In a fixed time pattern—intervals of 10 ms in the example shown—a measuring unit, which is not shown in more detail, is used to record the fuel pressure values FUP_1, FUP_2, FUP_3, FUP_4, etc. that are present at the fuel injector. A calculation of the injection time for the fuel injector also takes place at regular intervals by means of an evaluation unit, which is not shown in more detail, in consideration of the recorded fuel pressure values FUP_1, FUP_2, FUP_3, FUP_4. The calculations are designated in FIG. 1 with TI_Calculation A, TI_Calculation B, TI_Calculation C, TI_Calculation D, TI_Calculation E, TI_Calculation F, TI_Calculation G and TI_Calculation H and take place at the times TI_A, TI_B, TI_C, TI_D, TI_E, TI_F, TI_G, TI_H. The injection time calculation for this is segment synchronous, i.e. after each 120° rotational angle of the crankshaft in a six-cylinder engine. The segment time is 5 ms in the example shown.

For illustrative purposes, injection time calculations according to the prior art shall first be explained with reference to examples Case 1 and Case 2, as well as the problems that currently occur.

First, the example of Case 1 shall be discussed. The injection time calculation and the pressure acquisition run independently of each other. The combustion method in the example shown uses double injection, i.e. two injections I1 and I2 take place at different times in each combustion cycle. Each calculation of the injection time calculates the injection times for the two injections. With the second injection pulse, incorrect quantities from the first pulse can be corrected. An appropriate adjustment of the second injection is able to correct both a quantity of injected fuel that was too small and a quantity that was too large. At a later point in time, the injected fuel is ignited, as illustrated by the arrow IG in the figure.

At time TI_B, the injection times of the two injections I1, I2 are calculated as part of the injection time calculation TI_Calculation B taking the previously recorded fuel pressure FUP_1 that was present at the fuel injector as the basis. The injection I1 is then executed.

At time TI_C, the injection times for the two injections are calculated again in TI_Calculation C. According to prior art, the previously recorded fuel pressure value FUP_1 is in turn used as the basis for TI_Calculation C. This means that nothing is changed in the injection time for the injection I2 as part of the calculation TI_Calculation C. In the meantime, however, the pressure FUP has actually considerably increased compared to the first recorded pressure FUP_1. Considerably too much fuel will thus be injected with I2. This is not established with the injection time calculation TI_Calculation C. When the ignition IG takes place at a later time, the operating characteristics of the internal combustion engine will be adversely affected in an undesirable manner.

An injection time calculation according to the prior art shall now also be explained with reference to the example of Case 2. Case 2 shows an example that differs from Case 1 in that only one injection takes place per combustion cycle. This injection is indicated in Case 2 with I1'. In Case 2, the injection time TI_E for the injection I1' is calculated in TI_Calculation E at time TI_E on the basis of the last recorded fuel pressure value FUP_2. However, because the injection I1' takes place at a considerable time after the recording of the fuel pressure FUP_2, the fuel pressure FUP at the time of the injection I1' is considerably higher than the fuel pressure FUP_2 that was recorded previously. As a consequence, too much fuel is injected by the fuel injector in this example. In the subsequent ignition of the fuel, indicated by the arrow IG', the operation of the internal combustion engine is therefore subsequently undesirably impaired.

According to a first exemplary embodiment, the problems explained are solved in that, in the example shown in Case 2, two fuel pressure values FUP_1 and FUP_2 are recorded by the measuring unit and the fuel pressure that is actually present at the time of the injection is concluded in consideration of the times of the fuel pressure value recordings and/or crankshaft angle positions at the time of the fuel pressure value recordings. In the example shown, this occurs by means of an interpolation and extrapolation of the recorded fuel pressure values FUP_1 and FUP_2. This process determines that there is a linear increase in the fuel pressure FUP.

Because the time or crankshaft angle at the time of the injection I1' that is to take place is known, the actual fuel pressure FUP that is present at this time can be concluded in the calculation TI_Calculation E of the injection time. On the basis of this fuel pressure that is actually present, the injection time of the injection I1' can then be calculated. It is thus ensured that incorrect injections cannot occur.

Accordingly, the calculation of a second injection in a combustion cycle can also be calculated more accurately according to various embodiments than with the prior art. Likewise, previous injection events can be better checked and, if necessary, suitable countermeasures can be taken. This provides the advantages explained above.

In the example of Case 3 in the figure, a second exemplary embodiment is shown which can be applied in particular where there are very high demands for injection precision, such as with HCCI or CAI combustion methods. At the time indicated with A, the injection time for a subsequent injection I1" and an associated crankshaft angle are calculated as part of the calculation TI_Calculation E. The previously recorded fuel pressure FUP_2 is taken into consideration in the calculation.

In considering the time or the crankshaft angle position of this fuel pressure value FUP_2, it is determined that the injection I1" that is to take place lies a considerable time after the previous recording of the fuel pressure FUP_2. In order to increase the accuracy of the injection time calculation, the recording of a further fuel pressure value FUP_3" is therefore requested shortly before the next injection time calculation TI_Calculation F. The injection time calculation TI_Calculation F, on the contrary, lies shortly before the injection I1" that is to take place.

Because the recording of the fuel pressure value FUP_3" is shortly before the injection I1", the fuel pressure that is present at the time of the injection is concluded, whereby the last recorded fuel pressure FUP_3" is also assumed to be the fuel pressure that is present at the time of the injection I1". Effectively, the closeness in time of the fuel pressure recording and the injection mean that the fuel pressure FUP has hardly changed at the time of the injection. For the subsequent ignition IG", optimum operating parameters are thus largely achieved for the internal combustion engine.

In this way, an injection that has taken place shortly before a pressure recording can also be checked.

The advantages of the invention that have already been explained at the beginning are achieved with the exemplary embodiments.

What is claimed is:

1. A method for determining a control parameter for a fuel injector of an internal combustion engine, comprising the steps of:
   during an injection cycle of the fuel injector:
      recording at least two fuel pressure values at different times prior to an injection by the fuel injector, each recorded fuel pressure value indicating a fuel pressure currently present at the fuel injector,
      calculating an estimated fuel pressure expected to be present at the fuel injector at the time of the injection based at least in part on:
         the at least two recorded fuel pressure values, and
         at least one of (a) the respective time of each of the fuel pressure value recordings and (b) the respective crankshaft angle position of the internal combustion engine at the time of each of the fuel pressure value recordings, and
   controlling a control parameter regarding the injection based at least in part on the calculated estimated fuel pressure expected to be present at the fuel injector at the time of the injection.

2. A method according to claim 1, wherein the control parameter concerns at least one of the injection time, the opening lift of the fuel injector, the opening cross-section of the fuel injector, and an electrical variable serving to control the fuel injector.

3. A method according to claim 1, wherein at least one of the respective time of each fuel pressure value recording and the respective crankshaft angle position of the internal combustion engine at the time of each fuel pressure value recording is recorded and stored.

4. A method according to claim 1, wherein the fuel pressure expected to be present at the time of the injection is calculated by means of an interpolation and/or extrapolation of the recorded fuel pressure values.

5. A device for determining a control parameter for a fuel injector of an internal combustion engine, comprising:
   a measuring unit operable, during an injection cycle of the fuel injector, to record at least two fuel pressure values at different times prior to an injection by the fuel injector, each recorded fuel pressure value indicating a fuel pressure currently present at the fuel injector, and
   an evaluation unit configured to:
      determine an estimated fuel pressure expected to be present at the fuel injector at the time of the injection based at least in part on:
         the at least two recorded fuel pressure values, and
         at least one of (a) the respective time of each of the fuel pressure value recordings and (b) the respective crankshaft angle position of the internal combustion engine at the time of each of the fuel pressure value recordings, and
      control a control parameter regarding the injection based at least in part on the calculated estimated fuel pressure expected to be present at the fuel injector at the time of the injection.

6. A device according to claim 5, comprising a recording and storage unit operable to record and store at least one of the time of the fuel pressure value recording and the crankshaft angle position of the internal combustion engine at the time of the fuel pressure value recording.

7. A device according to claim 5, wherein the fuel pressure expected to be present at the time of the injection can be derived with the evaluation unit by means of an interpolation and/or extrapolation of the at least two recorded fuel pressure values.

8. A method for controlling a fuel injector of an internal combustion engine, comprising the steps of:
   during an injection cycle of the fuel injector:
      sensing at least two fuel pressure values at the fuel injector at different times prior to an injection by the fuel injector,
      using at least one of (a) the time of each of the fuel pressure value recordings and (b) the crankshaft angle position of the internal combustion engine at the time of each of the fuel pressure value recordings to determine an estimated fuel pressure expected to be present at the fuel injector at the time of the injection, and
      determining a value of a control parameter regarding the injection based at least in part on the determined estimated fuel pressure expected to be present at the fuel injector at the time of the injection.

9. A method according to claim 8, wherein the control parameter concerns at least one of the injection time, the opening lift of the fuel injector, the opening cross-section of the fuel injector, and an electrical variable serving to control the fuel injector.

* * * * *